ns011107281B2

(12) United States Patent
Hermina Martinez et al.

(10) Patent No.: US 11,107,281 B2
(45) Date of Patent: Aug. 31, 2021

(54) SHARED ENVIRONMENT FOR VEHICLE OCCUPANT AND REMOTE USER

(71) Applicant: Valeo Comfort and Driving Assistance, Creteil (FR)

(72) Inventors: David Saul Hermina Martinez, San Mateo, CA (US); Eugenia Yi Jen Leu, San Mateo, CA (US); Delbert Bramlett Boone, II, Redwood City, CA (US); Mohamed Amr Mohamed Nader Abuelfoutouh, San Mateo, CA (US); Christopher Steven Nowakowski, San Francisco, CA (US); Jean-Patrick Christian Marie Favier, Noiseau (FR); Félix Louis Jean Marquette, Paris (FR); Julie Marie Hardouin Arouna, Paris (FR); Siav-Kuong Kuoch, Saint Maur des fossés (FR)

(73) Assignee: VALEO COMFORT AND DRIVING ASSISTANCE

(*) Notice: Subject to any disclaimer, the term of this patent is extended or adjusted under 35 U.S.C. 154(b) by 0 days.

(21) Appl. No.: 15/984,065

(22) Filed: May 18, 2018

(65) Prior Publication Data
US 2019/0355178 A1    Nov. 21, 2019

(51) Int. Cl.
*G06T 19/00*    (2011.01)
*H04N 7/15*    (2006.01)
(Continued)

(52) U.S. Cl.
CPC ........ *G06T 19/006* (2013.01); *G06K 9/00838* (2013.01); *G06K 9/00845* (2013.01);
(Continued)

(58) Field of Classification Search
CPC .............. G06T 19/006; G06K 9/00838; G06K 9/00845; H04N 7/157; H04N 7/147; H04N 7/142; H04N 7/183; H04M 1/6091
See application file for complete search history.

(56) References Cited

U.S. PATENT DOCUMENTS

| 9,324,173 B2 | 4/2016 | Castelli et al. |
| 9,392,212 B1 | 7/2016 | Ross |

(Continued)

FOREIGN PATENT DOCUMENTS

| WO | 2018057980 | 3/2018 |
| WO | 2018230563 | 12/2018 |

OTHER PUBLICATIONS

Gaspar, John et al., "Providing Views of the Driving Scene to Drivers' Conversation Partners Mitigates Cell-Phone-Related Distraction", Psychological Science 2014, vol. 25 (12), pp. 2136-2146 (Year: 2014).*

(Continued)

*Primary Examiner* — Chante E Harrison
(74) *Attorney, Agent, or Firm* — Weaver Austin Villeneuve & Sampson LLP

(57) ABSTRACT

A method, system, computer-readable media, and apparatuses for providing a shared vehicle experience. The method includes capturing an exterior video stream that depicts an exterior environment of a vehicle, and receiving remote user information indicating a bodily movement of a remote user. The method further includes generating and displaying an augmented video stream comprising a dynamic avatar representing the remote user as a virtual passenger, the dynamic avatar being updated based on the remote user information while the augmented video stream is being displayed in the vehicle. At least a portion of the exterior video stream and occupant information are sent to a computer device that causes, based on the at least a portion of the exterior video (Continued)

stream and the occupant information, a display device of the remote user to output an additional augmented video stream that provides the remote user with an experience of being in the vehicle.

20 Claims, 12 Drawing Sheets

(51) Int. Cl.
  *H04N 7/14* (2006.01)
  *G06K 9/00* (2006.01)
(52) U.S. Cl.
  CPC ............ *H04N 7/142* (2013.01); *H04N 7/147* (2013.01); *H04N 7/157* (2013.01)

(56) References Cited

U.S. PATENT DOCUMENTS

| | | | | |
|---|---|---|---|---|
| 9,530,426 | B1* | 12/2016 | Wright | H04S 1/002 |
| 9,654,831 | B2 | 5/2017 | Stern | |
| 9,883,138 | B2* | 1/2018 | Chen | H04N 7/141 |
| 10,627,622 | B2* | 4/2020 | Kuehne | G02B 27/017 |
| 2010/0131947 | A1* | 5/2010 | Ackley | A63F 13/12 718/1 |
| 2013/0257899 | A1 | 10/2013 | Baron | |
| 2014/0177841 | A1 | 6/2014 | Hazzani et al. | |
| 2014/0245192 | A1* | 8/2014 | Chavez | G06F 3/04815 715/757 |
| 2014/0304750 | A1 | 10/2014 | Lemmey et al. | |
| 2014/0328148 | A1 | 11/2014 | Yang et al. | |
| 2017/0075373 | A1 | 3/2017 | Park et al. | |
| 2017/0293809 | A1 | 10/2017 | Thompson et al. | |
| 2017/0313248 | A1* | 11/2017 | Kothari | B60K 35/00 |
| 2017/0339372 | A1* | 11/2017 | Valli | H04N 7/157 |
| 2018/0089900 | A1* | 3/2018 | Rober | G06F 3/012 |
| 2018/0089901 | A1* | 3/2018 | Rober | G06F 3/011 |
| 2018/0091923 | A1* | 3/2018 | Satongar | H04R 5/033 |
| 2018/0232937 | A1* | 8/2018 | Moyer | G06T 15/005 |
| 2018/0259958 | A1* | 9/2018 | Kalanick | G05D 1/0022 |
| 2018/0350143 | A1 | 12/2018 | Kühne | |
| 2018/0369702 | A1* | 12/2018 | Hake | A63G 25/00 |
| 2019/0019329 | A1* | 1/2019 | Eyler | G06T 17/05 |
| 2019/0204604 | A1 | 7/2019 | Wu | |
| 2019/0258880 | A1 | 8/2019 | Brauer | |
| 2019/0302761 | A1 | 10/2019 | Huang et al. | |

OTHER PUBLICATIONS

Orts-Escolano, S., et al., "Holoportation: Virtual 3D Teleportation in Real-time", 29th ACM User Interface Software and Technology Symposium, Oct. 16-19, 2016, 14 pages.
International Search Report and Written Opinion—PCT/EP2019/061501—ISA/EPO—dated Jul. 30, 2019 13 pages.
International Preliminary Report On Patentability—PCT/EP/2019/061501—ISA/EPO—dated Nov. 24, 2020 7 pages.
U.S. Non-Final Office Action dated Dec. 4, 2020, in U.S. Appl. No. 16/667,644.

* cited by examiner

SHARED ENVIRONMENT FOR VEHICLE OCCUPANT AND REMOTE USER

BACKGROUND

Aspects of the present disclosure relate to facilitating audiovisual communication between two or more parties using mixed reality (MR), augmented reality (AR) and/or virtual reality (VR).

Telecommunication technology has enabled people to communicate with each other while being in different locations. Options for conducting a communication session are limited when one or more of the participants are mobile. For example, a person may engage in an audio conversation via a mobile phone while walking, whereas the same person could conduct a video conference when seated at a desk. Options for communicating while one or more participants are occupants of a vehicle are similarly limited.

BRIEF SUMMARY

Example embodiments of the present disclosure relate to providing a shared vehicle experience between one or more occupants of a vehicle and one or more remote users through presentation of audiovisual content that includes aspects of a virtual world generated using a model of a vehicle interior. The presentation may include real world content from an exterior environment of the vehicle. For example, in some embodiments the occupant and/or the remote user may be presented with images from a video stream of the exterior environment. Audiovisual content can be presented such that the occupant and the remote user are able to interact with each other within a common environment that includes real and virtual features.

Example embodiments of the present disclosure relate to using an avatar to represent a remote user as a virtual passenger in a vehicle. Although discussed in connection with motor vehicles, the example embodiments are applicable to other types of vehicles. As used herein, "occupant" refers to any person within a vehicle and "passenger" refers to any person in a vehicle besides a driver/operator of the vehicle. The avatar can be overlaid onto video generated based on a model of the interior of the vehicle and further based on video from the exterior environment. In this disclosure, the term "video" indicates a sequence of images (e.g., frames) over time, and does not necessarily include audio information. Although discussed as separate streams, audio and video can be combined for transmission. In one embodiment, a visual component of the audiovisual content (e.g., an augmented video stream) is presented in the form of a digital rearview mirror showing the avatar together with images from the exterior environment as seen through the rear window and/or side windows of the vehicle.

Example embodiments of the present disclosure relate to using an avatar to represent an occupant. As with the avatar of the remote user, the avatar of the occupant can be overlaid onto video generated based on a model of the interior of the vehicle and further based on video from the exterior environment, thereby forming augmented video. Generating video based on a model of a vehicle interior has processing and bandwidth advantages over capturing actual video of the vehicle interior because the interior does not usually change much over time. An avatar can be dynamically updated based on speech and/or bodily movements of the person the avatar represents. For example, avatars may be animated according to gestures, facial expressions, lip movements, etc. of the occupant or the remote user. Thus, the remote user and the occupant can interact through one or more avatars.

In one embodiment, a visual component of the audiovisual content is presented to the remote user though a VR headset or other VR device that depicts a virtual scene from the perspective of a virtual passenger. The VR headset/device simulates an experience of being in the vehicle, enabling the remote user see the interior of the vehicle while being presented with images of the exterior environment as if the remote user were actually looking through a vehicle window.

Embodiments of the present disclosure are directed to a method for providing a shared vehicle experience and a computer-readable medium storing instructions that cause one or more processors to perform the method, which includes capturing an exterior video stream that depicts an exterior environment of a vehicle, and receiving remote user information indicating a bodily movement of a remote user. The method further includes generating and displaying an augmented video stream comprising a dynamic avatar representing the remote user as a virtual passenger in the vehicle. The dynamic avatar is updated based on the remote user information while the augmented video stream is being displayed in the vehicle. The method further includes sending at least a portion of the exterior video stream and occupant information to a computer device that causes, based on the at least a portion of the exterior video stream and the occupant information, a display device of the remote user to output an additional augmented video stream that provides the remote user with an experience of being in the vehicle. The computer device can be a remote computer in communication with the display device (e.g., a central server in communication with a VR headset through one or more communication networks such as the Internet). Alternatively, the computer device can be collocated with the display device (e.g., a local computer communicatively coupled to a VR headset through a wired connection or wirelessly) or integral with the display device (e.g., a smartphone with an integrated display screen). The occupant information indicates a location of one or more occupants in the vehicle and a bodily movement of the one or more occupants while the augmented video stream is being displayed in the vehicle.

Embodiments of the present disclosure are directed to a system for providing a shared vehicle experience. The system includes at least one sensor configured to capture an exterior video stream that depicts an exterior environment of a vehicle, and one or more processors. The processors are configured to receive remote user information indicating a bodily movement of a remote user, generate an augmented video stream comprising a dynamic avatar representing the remote user as a virtual passenger in the vehicle, and cause the augmented video stream to be output on an in-vehicle display. The processors are further configured to update the dynamic avatar based on the remote user information while the augmented video stream is being displayed in the vehicle, and send at least a portion of the exterior video stream and occupant information to a computer device that causes, based on the at least a portion of the exterior video stream and the occupant information, a display device of the remote user to output an additional augmented video stream that provides the remote user with an experience of being in the vehicle. The occupant information indicates a location of one or more occupants in the vehicle and a bodily movement of the one or more occupants while the augmented video stream is being displayed in the vehicle.

Embodiments of the present disclosure are directed to a method for providing a shared vehicle experience, a computer-readable medium storing instructions that cause one or more processors to perform the method, and a corresponding system including one or more processors configured to perform the method. The one or more processors can be located in one or more computer devices, including a remote computer (e.g., a central server), a local computer (e.g., a personal computer, a VR console, or a smartphone), or a combination thereof. The method includes receiving one or more video streams corresponding to an exterior environment of a vehicle, and receiving occupant information indicating a location one or more occupants in the vehicle. The occupant information further indicates bodily movement of the one or more occupants while a video stream based on bodily movement of the user is being displayed in the vehicle. The method further includes generating an augmented video stream for output on a display device of the user, the augmented video stream comprising one or more dynamic avatars representing each of the occupants of the vehicle. The dynamic avatars are generated based on the occupant information. The augmented video stream is further generated based on the one or more video streams corresponding to the exterior environment of the vehicle. The method further includes capturing information indicating bodily movement of the user and capturing sound from the user, all while the augmented video stream is being displayed. The method further includes sending the information indicating bodily movement of the user and the captured sound to the vehicle.

BRIEF DESCRIPTION OF THE DRAWINGS

Aspects of the disclosure are illustrated by way of example. In the accompanying figures, like reference numbers indicate similar elements.

DETAILED DESCRIPTION OF THE INVENTION

Figure 1:
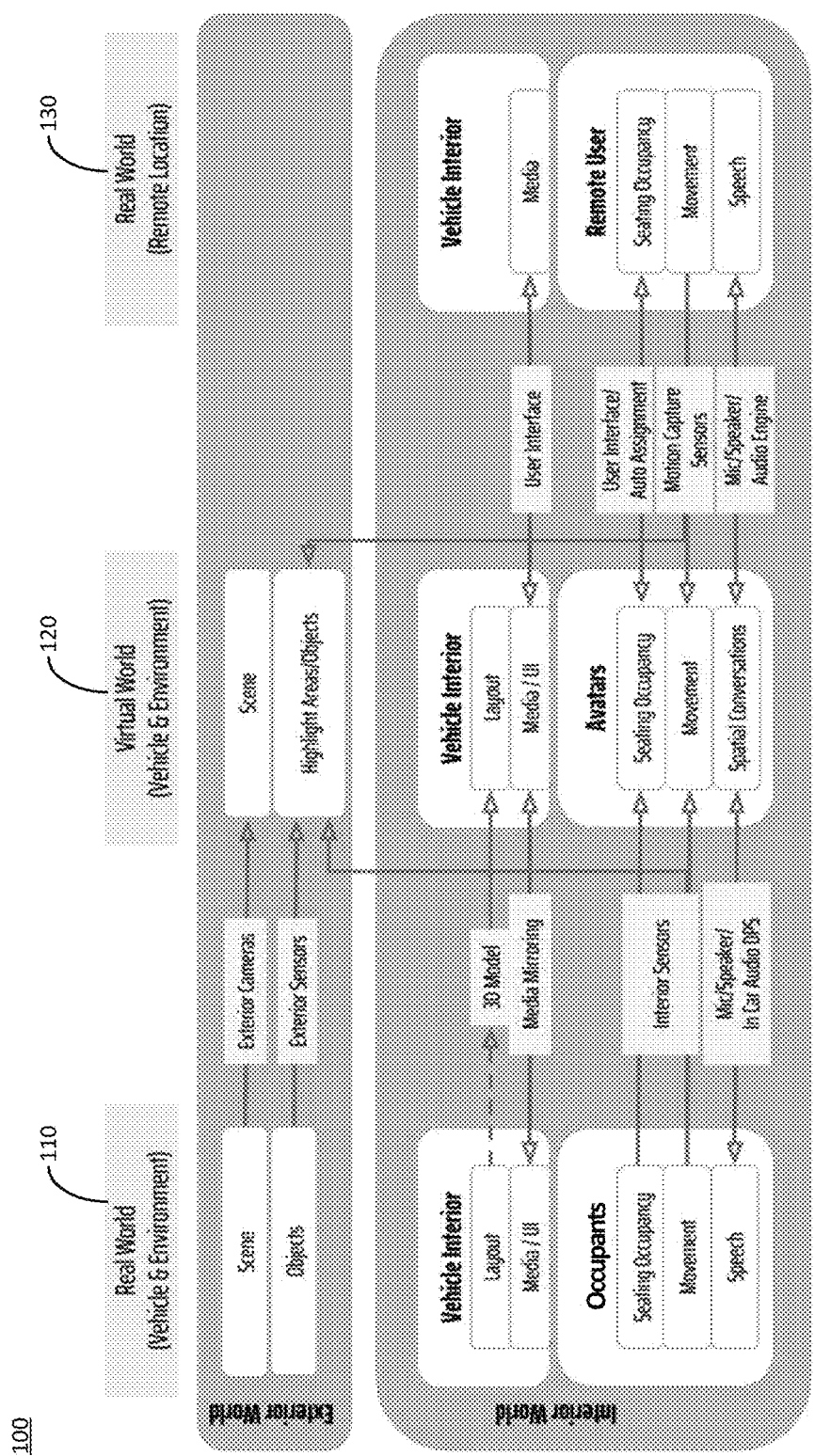
FIG. 1 is a functional block diagram illustrating interactions between various components in a system according to an embodiment.

The present disclosure relates a system, apparatuses and corresponding methods for providing a shared vehicle experience between one or more occupants of a vehicle and one or more remote users. Although devices such as webcams and videoconferencing applications allow people to communicate with each other in a face-to-face manner, implementing such communication in settings where one or more participants are mobile is quite challenging. For example, if one of the occupants is in a motor vehicle, the vehicle may not be equipped with videoconferencing capabilities. Additionally, conventional videoconferencing is limited in its ability to provide for a meaningful shared experience. Each participant cannot see, for example, the environment beyond the field of view of the other participant's camera. While it may be possible for a participant to move or adjust their camera to change the portion of the environment that is visible, the participant on the other end is still viewing the environment from the perspective of an outsider. Thus, a participant cannot truly understand what a participant on the other end of the videoconference is experiencing. This lack of a shared experience makes it difficult or impossible for the participants to access common reference points, a disadvantage that is especially apparent in situations where the environment of a participant contains items of interest to the other participant. For example, the exterior environment of a vehicle may have objects that are of interest to a remote user. As another example, the interior environment of the vehicle may include media being presented (e.g., music, photos, geographical maps, websites, etc.) that may also be of interest to remote users.

Accordingly, it is desirable to enable users to interact through a shared environment. For example, it may be desirable to provide a system that allows a vehicle occupant and a remote user to interact through mixed, augmented and/or virtual reality, creating the illusion as if the occupant and the remote user are inside the same vehicle. Such a system may be designed to allow occupants to engage with a remote user as if the remote user was also a passenger, by combining details about the exterior and interior environments of the vehicle with details about the remote user (e.g., what the remote user is saying and/or how the remote user is moving his or her body). The system may also operate for the benefit of the remote user by presenting aspects of the exterior and/or interior environment of the vehicle to the remote user from the perspective of a virtual passenger. Certain embodiments are described with respect to a single remote user. However, it will be understood that any of the embodiments described herein can be applied to multiple remote users.

Some embodiments may enable the occupants to see the remote user as if he or she were in the vehicle (e.g., laughing, pointing at objects in the surroundings), hear the remote user as if he or she were speaking from a location of the virtual passenger, and share media with the remote user (e.g., pictures, videos, music, websites, etc.). Similarly, embodiments described herein may enable the remote user to see the exterior environment of the vehicle as if he or she were in the vehicle (e.g., to enjoy scenery as seen through a vehicle window) and to interact with occupants from the perspective of the virtual passenger. Applications for such embodiments may include, but are not limited to: a shared road trip, a virtual tour guide, a virtual nanny to provide companionship for child passengers, a virtual companion for a solo traveler in a vehicle (e.g., the remote user can help keep the traveler awake and alert), and support, instruction, and/or monitoring for a new or elderly driver.

Motor vehicles are being equipped with increasing amounts of sensor technology designed to assist drivers in manually handling their vehicles in a variety of situations.

These sensors enable a variety of features such as driver monitoring, parking assist, lane departure warning, and blind-spot detection. It may be desirable to provide a shared environment as described above, while maintaining compatibility with current vehicle engineering, by leveraging existing equipment, such that technology which is already present for other purposes may be used to support creation of a shared environment. For example, an automobile may be equipped with interior cameras (e.g., in-cabin time-of-flight cameras) for detecting seating occupancy; in-vehicle microphones for hands-free telephony, noise-dependent volume control, and/or voice recognition functions; a digital rearview mirror display; exterior cameras that capture video or still images of the exterior environment (e.g., a rear camera that supports a parking assist function or provides images for a digital rearview mirror); and/or exterior ranging sensors to support object detection.

FIG. 1 is a functional block diagram illustrating interactions between various components in a system 100 connecting a vehicle occupant to a remote user. The system 100 is divided into real and virtual environments, with a virtual world 120 operating as a bridge between a real world 110 of the occupant and a real world 130 of the remote user. The left column of FIG. 1 corresponds to elements of the real world 110. The right column corresponds to elements of the real world 130. The middle column corresponds to elements of the virtual world 120, which is constructed based on input from both the real world 110 of the vehicle and the real world 130 of the remote location.

As shown in FIG. 1, various technologies can be used to capture, create, and transmit information between the real and virtual worlds. The real world 110 includes the exterior environment of the vehicle. The exterior environment comprises a scene and objects located within the scene. Information about the scene may be generated using images or video captured by exterior cameras, which can be located anywhere on the vehicle, such as mounted on the outside of the vehicle or inside the vehicle (e.g., facing a window), as long as the cameras can capture a view of the exterior environment. Typical locations of exterior cameras include one or more of: on the rearview mirror, on one or both side-view mirrors, at the top of the windshield, at the top of the back window, at the front of the vehicle, and at the rear of the vehicle. For situations in which the exterior environment is relatively constant over time (e.g., while driving through featureless surroundings, or during foggy weather or at night), the exterior cameras can be controlled to capture an exterior video stream at a low and/or irregular frame rate.

The scene information may be used to replicate aspects of the real world scene in the virtual world 120. Similarly, the real world objects may be detected, classified, and its motion parameters estimated using one or more exterior sensors (e.g., radar, cameras, ultrasonic sensors, Light Detection and Ranging (LIDAR) sensors, etc.) and information about the objects may be used to replicate aspects of the objects in the virtual world.

The real world 110 also includes the interior environment of the vehicle, i.e., the vehicle interior and its occupants. The vehicle interior comprises the physical layout of the vehicle cabin and various electronics that provide user interfaces including in-vehicle displays and other devices through which media content (e.g., digital media) are presented to the occupants. The layout of the vehicle can be stored in a three-dimensional (3D) model, which can be captured through optical scanning or built using other 3D modeling techniques. The 3D model can be generated in advance of a communication session between an occupant and the remote user, so that the 3D model is available for use in creating a virtual replica of the vehicle interior. In one embodiment, the 3D model of the vehicle may correspond to the exact make and model of the vehicle in use. In another embodiment, the 3D model may correspond to a generic interior of a vehicle, or any other 3D model without departing from the teachings of the present disclosure. In order to provide information about media that is presented by the user interfaces to the virtual world, the user interfaces may be equipped with media mirroring capabilities, cloud streaming or any other media transfer and/or communication capabilities. For example, visual media shown on an in-vehicle display (e.g., an instrument cluster, navigation system, or center console) can be replicated through mirroring to show the same media on a virtual counterpart to the in-vehicle display.

The vehicle may include various types of interior sensors that can be used to capture information about an occupant. Such sensors may include a seat-mounted weight sensor, a visible and/or an infrared spectrum camera, or a time-of-flight camera, and may operate to detect physical attributes and/or changes in the physical state of an occupant, as well as emotional attributes and/or changes in the emotional state of an occupant. For example, the interior sensors may be used to determine a seated location and a bodily movement of the occupant. Examples of bodily movements include, but are not limited to, head movements, eye movements, lip movements, facial expressions, and gestures performed using a hand and/or arm (e.g., pointing to an object in the exterior environment). Bodily movements can be captured using imaging sensors (e.g., a video camera) and/or non-imaging sensors, including vehicle mounted sensors and sensors worn on the body (e.g., a glove or other wearable appliance including one or more of the following: an infrared or ultrasonic motion sensor, an accelerometer, or a gyroscope). The system may analyze bodily movement information to determine, for example, a body posture of the occupant or to determine which interior or exterior object(s) the occupant is looking at or pointing to.

Additionally, the vehicle may include sensors that capture sound from an occupant (e.g., a microphone that captures speech or other human sounds) and an audio output device such as a headset worn by the occupant or a speaker located within the vehicle interior. The vehicle may include a data processing system (DPS) that captures and sends speech from the occupant to the virtual world 120 to enable the occupant to engage in conversation with the remote user.

The system 100 includes components that capture, generate, and transmit information between the virtual world 120 and the real world 130 of the remote user. Some of these components may be analogous to the components discussed earlier with respect to the real world 110. For example, the real world 130 may include a user interface by which media presented in the virtual world 120 (e.g., digital media that is mirrored from the real world 110) is transmitted for presentation to the remote user. The user interface may also allow the remote user to select and transmit media content (e.g., a media item stored on a computer device accessible to the remote user) for playback in the real world 110, thereby sharing the media with the occupant. In some embodiments, the system 100 includes a user interface that allows the remote user to select an empty seat in the vehicle for placement of the virtual passenger. The location of the virtual passenger can also be automatically assigned based on an algorithm executed by the system.

As with the occupant, information about bodily movements or emotional states of the remote user can be captured, together with sound produced by the remote user, using various types of sensors. The sensors can be used to determine, for example, whether the remote user is seated or standing (or any other body posture), and where the remote user is looking or pointing (e.g., gazing at a virtual counterpart to an object in the real world 110). The system 100 may include a computer device with an audio module that processes sound captured from the remote user for transmission to the occupant as an audio stream. The audio module may be communicatively coupled to one or more audio output devices (e.g., headphones integrated into a VR headset) to transmit audio from the occupant for playback to the remote user.

In some embodiments, audio can be output to the occupant and/or the remote user in a directional manner to provide a spatial audio experience. For example, a vehicle may include multiple speakers that are located throughout the interior and selectively controlled to simulate audio from the direction of the virtual passenger (e.g., based on the seat position assigned to the virtual passenger). Similarly, a VR headset worn by the remote user may include earpieces that can be controlled to simulate audio from the direction of the occupant. Audio output can also be varied according to changes in the head position of a remote user or occupant in order to provide a more realistic audio experience. Thus, the remote user can engage in conversation with the occupant as if the remote user were physically present in the vehicle.

In some embodiments, the occupant and the remote user can interact through bodily movements to provide feedback to each other. For example, a gesture of the occupant may be analyzed to determine that the occupant is pointing to an object in the real world 110. In response, the output of a display device of the remote user may be updated to highlight a virtual counterpart to the real world object or highlight an area around the virtual counterpart. Likewise, a gesture of the remote user can be analyzed to determine that the remote user is pointing to a virtual object, so that an image depicting the virtual object on an in-vehicle display can be highlighted or otherwise annotated to bring attention to the real world counterpart.

Figure 2:
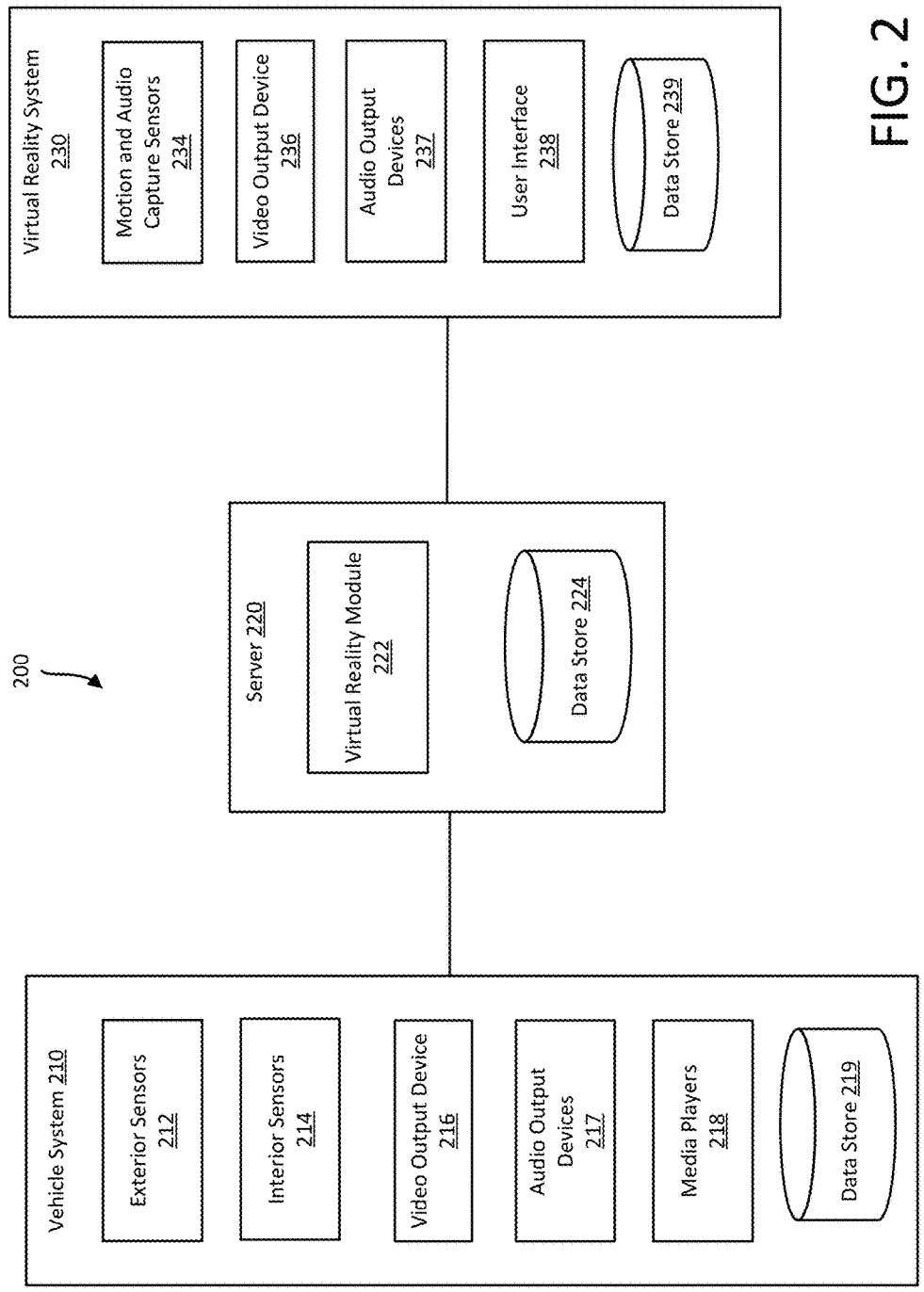
FIG. 2 is a simplified block diagram of a system according to an embodiment.

FIG. 2 is a simplified block diagram of a system 200 implementing features described earlier with respect to FIG. 1. The system 200 includes a vehicle system 210, a server 220, and a VR system 230. The vehicle system 210, the server 220, and the VR system 230 may each include one or more computer processors that execute instructions for providing the functionalities described herein. However, the processing steps in the system 200 or in any of the methods described herein may be embodied in hardware (e.g., processors or circuits) or in a combination of hardware, software and/or firmware. Although shown separately, the server 220 can include components that are part of the vehicle system 210 and/or the VR system 230. Thus, the server 220 can be located with either the vehicle system 210 or the VR system 230, duplicated in both the vehicle system 210 and the VR system 230, or (as shown in FIG. 2) reside separately in a third location. Communication between the vehicle system 210, the server 220, and the VR system 230 may be performed over one or more wireless communication networks such as a cellular network or a Wi-Fi network or a combination of both. Communications may be routed through additional entities not shown. Additionally, although only one VR system 230 is shown, the system 200 may include multiple VR systems, each operated by a respective remote user. Thus, the system 200 can provide a shared vehicle experience between one or more vehicle occupants and multiple remote users, where the remote users are not necessarily in the same physical location.

The vehicle system 210 includes exterior sensors 212, interior sensors 214, one or more video output devices 216 (e.g., at least one in-vehicle display), audio output devices 217, media players 218 (which can also include in-vehicle displays), and a data store 219. The exterior sensors 212 may include cameras capturing still or video images of the exterior environment of the vehicle. In some embodiments, exterior sensors 212 capture videos that are processed to form a panoramic video providing 360 degrees of coverage around the vehicle. The panoramic video can be formed by stitching together video from multiple exterior sensors 212.

The interior sensors 214 capture bodily movements of vehicle occupants and sound produced by the occupants. The interior sensors 214 may also include one or more audio capture sensors, for example a microphone that supports hand-free telephone calls. One or more of the interior sensors 214 may be a component of a driver monitoring system. The vehicle system 210 may be configured to distinguish, based on data captured by the interior sensors 214, between different occupants when the vehicle is occupied by multiple people. For example, the vehicle system 210 may apply to speech input, received from microphones placed in various locations throughout the vehicle, voice recognition to filter out the voices of occupants who are not participating in a communication with the remote user or to generate separate audio streams (e.g., a stream for each individual occupant) for output to the remote user as spatial audio using weighted audio panning or other audio output techniques. The spatial audio output to the remote user can be generated based on received location information indicating a location of each occupant in the vehicle.

The vehicle system 210 can also apply digital signal processing techniques to determine where an occupant is looking or pointing, for example by tracking head or eye movements to identify a direction in which the occupant is gazing or ray tracing along a direction defined by the occupant's arm or finger to identify an object in the exterior environment.

The video output device 216 may be configured to present an augmented video stream combining elements of real and virtual worlds. Examples of display technologies that may be used for a video output device include, for example: liquid crystal display (LCD) panels, organic light-emitting diode (OLED) panels, and quantum dot displays. In one embodiment, the video output device 216 is a digital rearview mirror that displays video of a rear scene behind the vehicle. The video of the rear scene may be augmented to include an avatar representing the remote user as a virtual passenger. In another embodiment, the video output device 216 is a portable or wearable AR, VR, or MR device. An occupant wearing an AR device may see the avatar of the remote user superimposed on the physical seat assigned to the virtual passenger. Different types of video output devices can be used depending on where the occupant is located and what tasks the occupant is engaged in. For example, a VR headset can provide for a more immersive experience compared to AR glasses, but may not be suitable for use by a driver since the driver needs to pay attention to the road ahead with the exception of when riding in an autonomous vehicle.

Figure 3:
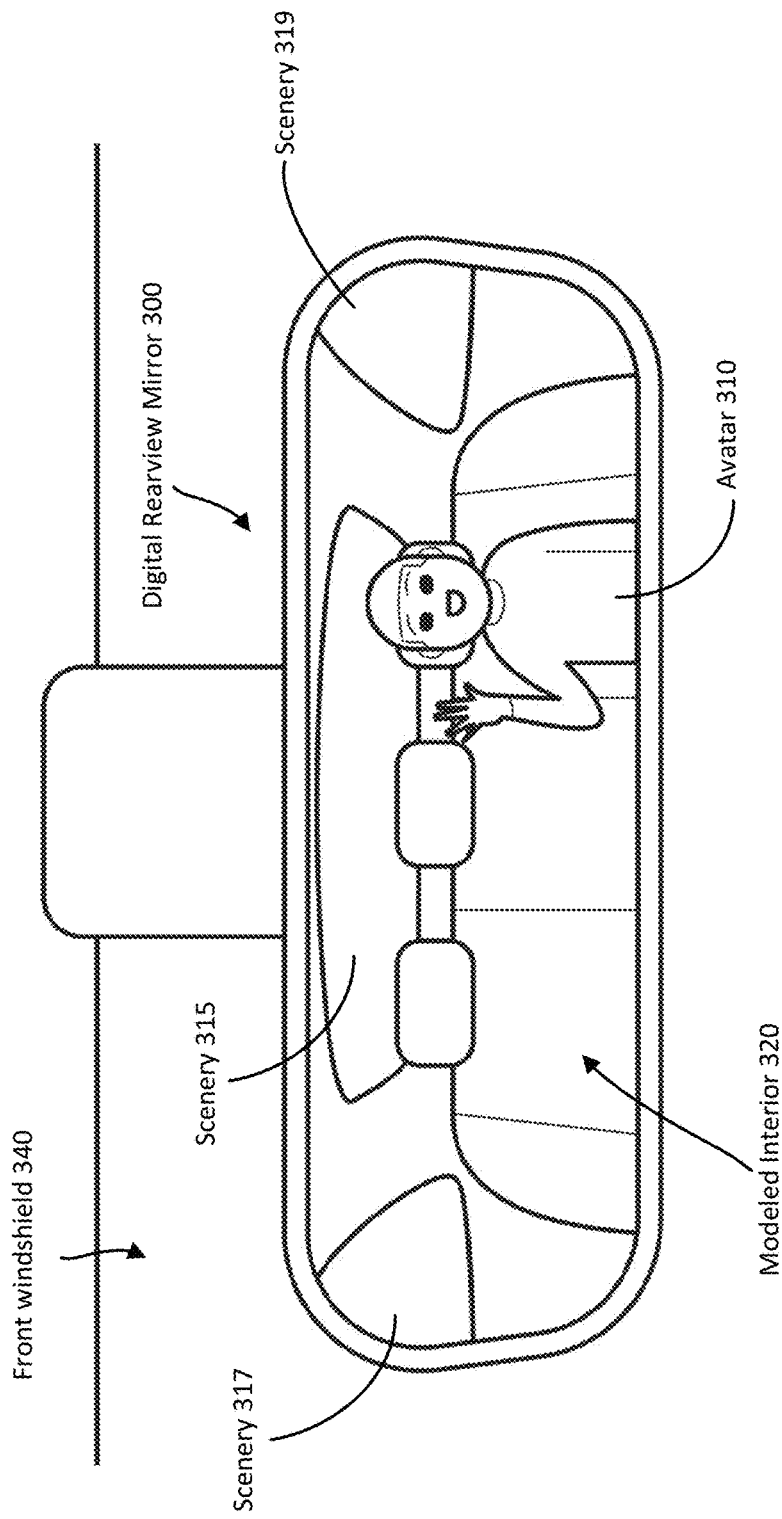
FIG. 3 shows an example of a digital rearview mirror displaying an avatar.

FIG. 3 shows an example of a digital rearview mirror 300 displaying an avatar 310 of a remote user as a virtual passenger within a vehicle interior 320. The vehicle interior 320 can be rendered using a 3D model, which can be stored locally and/or remotely (e.g., in the data store 219 or on the server 220). The digital rearview mirror 300 may also show scenery from the real world including, for example, scenery 315 captured by a rear-facing exterior camera, and scenery 317 and 319 captured by side-facing exterior cameras. The scenery 315, 317, and 319 may be combined into a video stream that is augmented by overlaying details of the vehicle interior 320 and the avatar 310. Thus, the digital rearview mirror 300 may display a portion of a video stream corresponding to the exterior environment as seen through at least one of a side window or a rear window of the vehicle. A similar display may be provided for a back-seat passenger, for example through a tablet device.

The digital rearview mirror 300 may be configured to display mirrored (horizontally flipped) images, as if the scenery 315, 317, and 319 and the avatar 310 were being viewed through an optical mirror (e.g., creating a mirroring effect). Other types of video output devices can also be configured to display mirrored images and/or video streams. For example, a mirrored video stream may be presented on a display panel that is mounted on the back of a front seat of the vehicle for viewing by a back-seat occupant (also called a "seat-back display") or on a ceiling mounted display.

The digital rearview mirror 300 can be adjusted, for example, by zooming in or out, toggling between an augmented video stream and a non-augmented video stream (e.g., a video stream showing only the exterior environment as captured by the rear-facing camera), or activating a split-screen mode to simultaneously display an augmented video stream and a non-augmented video stream. One advantage of using a digital rearview mirror is that an occupant can interact with the remote user while maintaining attention towards the exterior environment, for example by looking through a front windshield 340.

The avatar 310 can be a two-dimensional (2D) or 3D avatar. In some embodiments, the avatar 310 may be generated based on a likeness of the remote user (e.g., created using a captured image of the remote user). The avatar 310 can be a static avatar that is used to represent the remote user as the virtual passenger, but is not otherwise updated. Alternatively, the avatar 310 can be dynamically updated in response to input from the remote user such as bodily movements or manual selection of a new seat location. If the remote user stands up or shifts his seated position, the avatar can likewise be updated to stand or move. Similarly, the avatar can mimic lip movements (lip-syncing), head movements, body postures or gestures (e.g., waving or pointing). Animated 3D avatars can be created using a character rig, which is a skeletal representation that defines the joints and bones. The complexity of such a rig may be based on the range of motion to be captured and animated. In some embodiments, avatars can be updated with facial animations based on an emotional state of the user/occupant, with the emotional state being detected based on sensor data (e.g., through analysis of captured speech or facial images).

Returning to FIG. 2, the audio output devices 217 may include speakers positioned throughout the vehicle interior, such as on the vehicle doors, along the dashboard, or behind the rear passenger seats. The audio output devices 217 can be controlled through audio signal processing to provide spatial audio corresponding to sounds captured from the remote user. The spatial audio is output based on received location information indicating a location of the virtual passenger. Spatial audio can be achieved, for example, by dynamically adjusting the volume and timing of audio output devices in different locations throughout the vehicle so that the sounds captured from the remote user appear to be coming from the seat of the virtual passenger. Multiple audio sources may play simultaneously over the audio output devices 217. For example, when the remote user speaks while music is playing in the vehicle, both the music and the remote user's speech can be mixed for generating spatial audio corresponding to the user's speech while the audio speakers continue to play the music. In some embodiments, one or more of the audio output devices 217 are wearable devices, for example a wireless headphone.

The media players 218 may be used for presentation of media, such as audio media, visual media, or multimedia content, for playback to an occupant, including presentation of content shared by a remote user. For example, the vehicle may include a center console display for playback of visual media to a driver or front passenger, and a secondary display for a passenger seated in the rear.

The data store 219 may include one or more memory devices that store information used during a communication session. Examples of such information include the 3D model of the vehicle interior, media content, avatar images or models, video streams captured by the exterior cameras or transmitted from the server 220, and user profiles or user configuration settings.

The server 220 may include one or more computer devices that transmit information between the vehicle system 210 and the VR system 230. The server 220 may process this information using a virtual reality module 222 to form the virtual world 120 as a composite of real and virtual elements. For example, the virtual reality module 222 may generate instructions for execution by a processor of the server 220 and which cause the processor to generate an augmented video stream for display by the VR system 230. The server 220 may also handle processing of media content (e.g., converting media formats or facilitating the transmission of media between the vehicle system 210 and the VR system 230) and audio from the occupant or remote user.

Some of the processing of audiovisual content (e.g., media content, video streams, or audio streams) may be performed locally on the vehicle system 210 or the VR system 230. For example, an augmented video stream shown on a digital rearview mirror can be generated by the vehicle system 210 since the source video for the augmented video stream is captured using cameras in the vehicle, and therefore the source video may not need to be transmitted to the server 220 for the purpose of generating the augmented video stream for output to the vehicle occupant. On the other hand, the generation of an augmented video stream for output to the remote user can be handled by the server 220 since the server may include computing resources (e.g., the virtual reality module 222) that are specifically configured for creating a 3D virtual environment that can be experienced through a VR headset or other VR device of the remote user.

The server 220 may include a data store 224 that stores information used during a communication session. The information contained in the data store 224 may overlap with information contained in the data store 219 of the vehicle system or in a data store 239 of the VR system 230. For example, the data store 224 may provide for temporary storage of media content during media mirroring, while the data store 219 or 239 provides for permanent storage of media content. The data store 224 may also include buffer memory for temporary storage of audio or video streams.

The VR system 230 may include motion and audio capture sensors 234, a video output device 236, audio output devices 237, a user interface 238, and a data store 239. The elements 234, 236, 237, and 239 are respectively analogous to the interior sensors 214, the video output device 216, the audio output devices 217, and the data store 219 of the vehicle system, but do not necessarily provide identical functionality. For example, a motion sensor of the motion and audio capture sensors 234 may track head movement using gyroscopes, accelerometers, structured light systems, etc. in a VR headset and hand/body movement using motion tracking controllers or time-of-flight cameras, whereas the interior sensors 214 may include an in-cabin time-of-flight camera. As another example, the output of spatial audio on the audio output devices 217 may be performed differently than on the audio output devices 237 (e.g., controlling five or more speakers in the vehicle versus two speakers in a VR headset).

The user interface 238 may enable selection of media content for sharing with an occupant. The media content selected through the user interface 238 can be stored locally (e.g., in data store 239) or remotely (e.g., in data store 224). The user interface 238 can be a graphical user interface on an external display monitor or touchscreen. In some embodiments, the user interface 238 is rendered in the virtual environment, e.g., as an additional virtual in-vehicle display.

Although described as part of a virtual reality system, the video output device 236 does not need to provide fully immersive VR output in order for the remote user to share in the vehicle experience. In some instances, the video output device 236 may even be implemented as a 2D display, for example on a smartphone or television. However, since the remote user is not tasked with the responsibility of operating the vehicle and generally has room to move around freely, VR output may be advantageous in the remote setting. Thus, the video output device 236 can be implemented as a VR headset or, in some cases, an AR or MR device. Other types of video output devices, such as holographic displays, non-wearable VR displays utilizing optical mirrors, etc. may be used. Various elements of the system 200 can be implemented as general or special purpose computer devices, each with one or more processors such as a central processing unit or a graphics processor. Additionally, elements may be combined into a single computer device. For example, the video output device 236 and the audio output devices 237 may be part of a VR headset or smartphone, but can also be implemented using a combination of a personal computer, external display monitor, and external speakers.

The video output device 236 may provide a viewing window through which the remote user can view the vehicle interior and the exterior environment of the vehicle from the perspective (viewpoint) of a viewer located at the position of the virtual passenger. The video output device 236 may include an input element for controlling the viewing window. For example, if the video output device is a smartphone, the remote user may trigger a change in the position of the viewing window by tilting or rotating or through translational movement of the smartphone to activate a gyroscope or accelerometer, or by swiping across a touchscreen of the smartphone. Similarly, if the video output device is a VR headset, the remote user may reposition the viewing window by moving his or her head, thereby simulating the experience of looking around the vehicle while seated in the position of the virtual passenger. Similar to the example of FIG. 3, where the avatar 310 of the remote user is shown on a digital rearview mirror, the video output device 236 may display one or more avatars of the vehicle occupants. Alternatively, avatars of occupants can be omitted from display, in which case the remote user may rely on audio communication for interacting with occupants.

The audio output devices 237 may include external speakers arranged in a similar fashion to speakers in the vehicle or arranged in positions corresponding to the vehicle seats. Alternatively or additionally, the audio output devices 237 may include speakers in a VR headset or other wearable device that includes both an audio output device 237 and the video output device 236.

Methods that may be performed in a system according to the embodiments of FIGS. 1 and 2 are now described. Although presented as a sequence of steps, each of the methods described herein may be performed with certain steps being executed in a different order, omitted, or in parallel.

Figure 4:
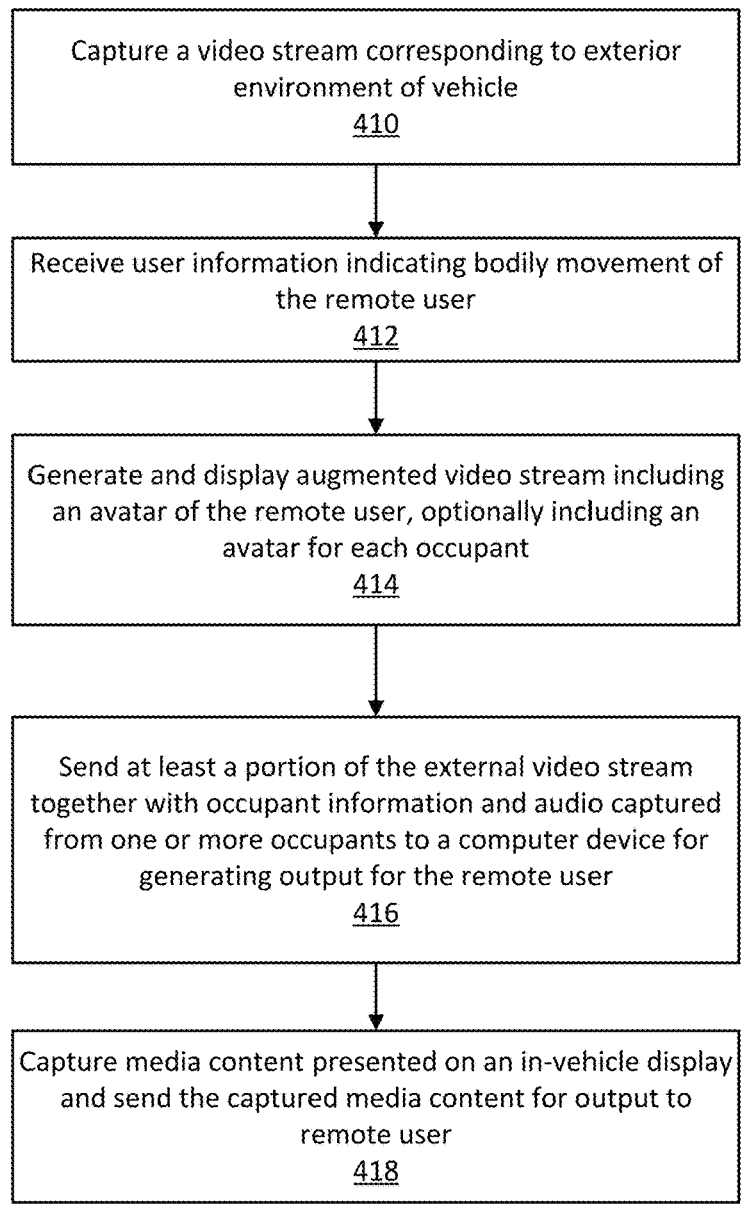
FIG. 4 is a flowchart of a method for providing a shared vehicle experience to a vehicle occupant, according to an embodiment.

FIG. 4 is a flowchart of a method 400 for providing a shared vehicle experience to a vehicle occupant, according to an embodiment. The method 400 involves presenting an augmented video stream for display in the vehicle. At step 410, a video stream correspond to an exterior environment of a vehicle is captured using one or more exterior cameras. For convenience, a stream depicting the exterior environment shall be referred to herein as an "exterior video stream." The vehicle may include multiple exterior cameras for capturing different views of the exterior environment, e.g., to produce panoramic video.

At step 412, user information indicating a bodily movement of a remote user is received from a computer device on the remote user side, e.g., from the VR system 230. The remote user information can be received and processed at the server 220, and can also be transmitted to the vehicle system 210 for processing. As mentioned earlier, bodily movements can include head, lip, eye, or facial movements, as well as gestures performed using an arm or finger, or any other type of body motion.

At step 414 an augmented video stream is generated to include an avatar representing the remote user as a virtual passenger in the vehicle. The augmented video stream can be generated by the vehicle system 210 and/or the server 220. The augmented video stream may optionally include an avatar for an occupant. For example, a driver looking at a digital rearview mirror may see a first avatar representing the remote user and a second avatar representing an occupant seated next to the virtual passenger, even though the occupant is physically present in the vehicle. The augmented video stream may be generated using a 3D model of the vehicle interior and further using an exterior video stream (e.g., video captured by one or more exterior cameras). The position of the virtual passenger can be manually selected by the remote user or an occupant, or automatically selected, for example using an algorithm that assigns a seat based on a determination of which seats are unoccupied, the total number of occupants, the positions of the occupants, a preferred order of assignment, or a combination of these and other factors. The augmented video stream can be a mirrored video stream and is displayed on a video output device of the vehicle (e.g., using a digital rearview mirror). The augmented video stream can be updated based on the remote user information (e.g., by updating the avatar) while the augmented video stream is being displayed in the vehicle, to provide live feedback on the movements of the remote user.

At step 416, the vehicle system 210 may capture and send at least a portion of the exterior video stream together with occupant information to a computer device for generating output for the remote user, e.g., transmitting the exterior video stream and occupant information to the VR system 230 or the server 220. In some embodiments, only that portion of the exterior video stream which is relevant to the viewing window of the remote user is transmitted. The occupant information is analogous to the remote user information in that the occupant information may indicate bodily movements of one or more occupants, and can therefore be used in a similar fashion to create augmented video comprising an avatar of an occupant. Additionally, occupant information may indicate a location of one or more occupants (e.g., where each occupant is seated and an identity of each occupant). Occupant or remote user information may also indicate where the subject is looking or pointing, and can therefore be used for annotating images of the exterior environment.

The occupant information may indicate the location and bodily movement of one or more occupants while the augmented video stream is being displayed in the vehicle, and may be transmitted together with the exterior video stream to generate an additional, separate augmented video stream on the remote user side. The exterior video stream and the occupant information can be processed by the computer device (e.g., by the VR system 230 with assistance from the server 220 or by the server 220 alone) to generate the separate augmented video stream for display on a display device of the remote user (e.g., on the video output device 236). The vehicle system may also send an audio stream corresponding to sound captured from one or more occupants. The audio stream may be used for generating audio output (e.g., spatial audio) in synchronization with the augmented video stream displayed to the remote user.

At step 418, the vehicle system may capture media content presented on one or more in-vehicle displays and send the captured media content for output to the remote user. The media content can be rendered in the virtual environment (e.g., on virtual counterparts to the in-vehicle displays) or on a separate display device of the remote user. Step 418 can be performed concurrently with step 416 to provide real-time updates on changes in the interior and exterior environment of the vehicle.

Figure 5:
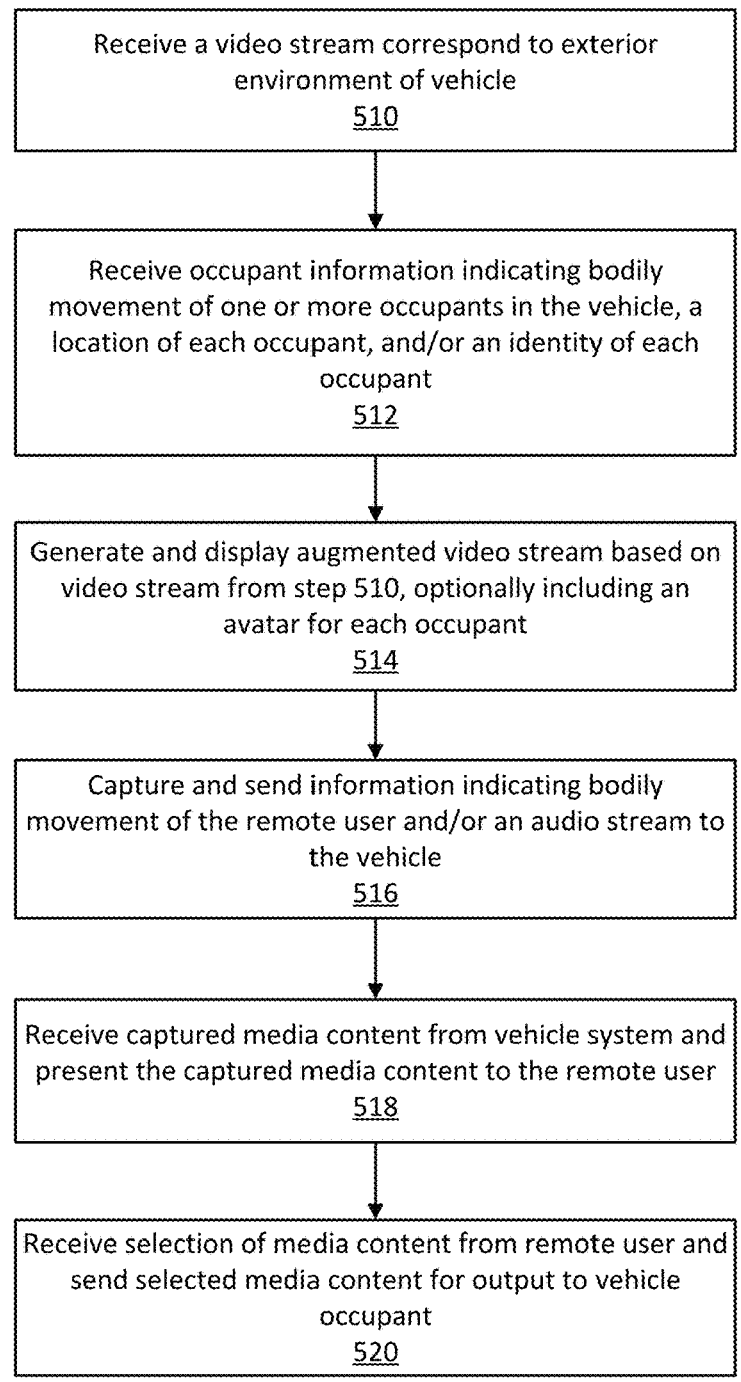
FIG. 5 is a flowchart of a method for providing a shared vehicle experience to a remote user, according to an embodiment.

FIG. 5 is a flowchart of a method 500 for providing a shared vehicle experience to a remote user, according to an embodiment. The method 500 includes various steps of receiving information relating to a vehicle and its occupants. Such information may be transmitted directly from the vehicle to the VR system 230 or through an intermediary such as the server 220.

At step 510 one or more video streams corresponding to an exterior environment of the vehicle are received, e.g., by the server 220.

At step 512, occupant information indicating bodily movement of one or more occupants in the vehicle and a location of each occupant are received, e.g., by the server 220. Additionally or alternatively, the occupant information may indicate a location (e.g., a seat position) of each occupant or identify each occupant (e.g., by actual name or username).

At step 514, the VR system 230 and/or the server 220 generates an augmented video stream based on the video stream(s) received in step 510 and causes the augmented video stream to be output on a display device of the remote user. The augmented video stream can be generated by determining a viewing window for the remote user and mapping the augmented video stream to the viewing window (e.g., using a virtual camera as discussed in connection with FIG. 6A). For example, if the remote user is wearing a VR headset, the viewing window may be defined according to the user's head position and/or gaze direction, and further based on the seat position assigned to the virtual passenger. In some embodiments, the server 220 may receive, from the VR system 230, information regarding the viewing window and transmit augmented video to the VR system for viewing by the remote user. The augmented video may include the at least a portion of the exterior video stream sent in step 416 of FIG. 4, where the at least a portion of the exterior video stream corresponds to the exterior environment as seen through the viewing window.

As with step 414 in FIG. 4, the augmented video stream may optionally include an avatar for each occupant. As an alternative to occupant avatars, the augmented video stream may include video depicting the actual occupant. An additional camera may need to be used in order to capture video of the actual occupant, for example to capture video of a back-seat passenger.

At step 516, the VR system 230 captures and sends information indicating bodily movement of the remote user to a computer device of the occupant, e.g., transmitting remote user information to the vehicle system 210 via the server 220. The VR system 230 may also capture sound from the remote user to generate and send an audio stream to the computer device of the occupant. The information sent from the VR system 230 can be used to generate an augmented video stream and/or an audio stream for the occupant, e.g., according to the method of FIG. 4.

At step 518, the VR system 230 receives captured media content from the vehicle system 210. The captured media content corresponds to content presented on one or more in-vehicle displays and can be sent through the server 220. The VR system 230 presents the captured media content to the remote user, e.g., on a virtual display (in which case the captured media content may be integrated into the augmented video stream displayed in step 510) or on a separate display device such as an external monitor.

At step 520, the VR system 230 receives a selection of media content from the remote user (e.g., media content stored on the data store 239 and selected using the user interface 238) and sends the selected media content (e.g., through the server 220) for output to one or more vehicle occupants. The selected media content may be presented on at least one in-vehicle display. For example, if there are multiple occupants, the selected media content can be output for simultaneous presentation on different in-vehicle displays to enable each of the occupants to view the media content.

Figure 6A:
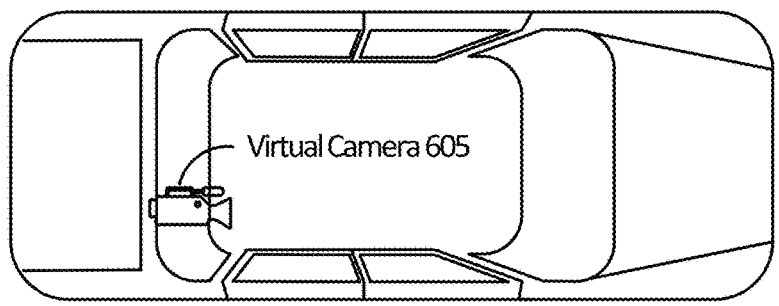
FIG. 6A shows an example location for a virtual camera used for rendering a remote user's view.
Figure 6B:
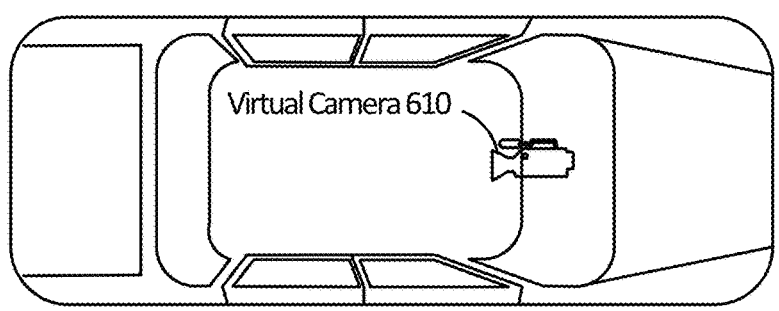
FIG. 6B shows an example location for a virtual camera used for rendering an occupant's view.

FIGS. 6A and 6B show example locations for virtual cameras used for rendering, based on a 3D vehicle model, views for the remote user and the occupant. In FIG. 6A, a virtual camera 605 is positioned in a rear of the vehicle (e.g., behind an unoccupied passenger seat) to render the scene observable from the viewpoint of a virtual passenger sitting in the same position. The rendered scene may include a 3D model of the vehicle, one or more images/video streams of the external environment and one or more avatars of the occupants. In one example, the rendered scene may include portions of the avatar of the virtual passenger, such as the hands. The virtual camera 605 can be used to extract a relevant portion of the virtual environment for generating, according to a viewing window of the remote user, an augmented video stream that is displayed to the remote user. The extraction can be performed locally by the VR system 230 or on the server 220 (assuming the server is physically separate from the VR system). For example, as explained earlier, the server 220 may receive information regarding the viewing window and transmit augmented video to the VR system 230 for viewing by the remote user.

In FIG. 6B, a virtual camera 610 is positioned in the front of the vehicle (e.g., at approximately the same location as a rearview mirror) to render the scene observable through the rearview mirror. The rendered scene may include a 3D model of the vehicle, one or more images/video streams of the external environment, one or more avatars of the occupants and/or the virtual passenger. The virtual camera 610 can be used to extract a relevant portion of the virtual environment for generating an augmented video stream that is displayed on a digital rearview mirror. The extraction can be performed locally by the vehicle system 210 or on the server 220 (assuming the server is physically separate from the vehicle system). Virtual cameras used for rendering occupant views can be adjusted according to where the video stream is to be displayed. For example, a video stream intended for a seat-back display may be viewed from a smaller distance than a rearview mirror display, such that a smaller focal length and/or smaller field of view may be desirable. It may also be desirable, for example, for a seat-back display to depict a width of at least two passenger seats (e.g., the seat assigned to the virtual passenger and an adjacent seat occupied by an actual passenger).

Figure 7:
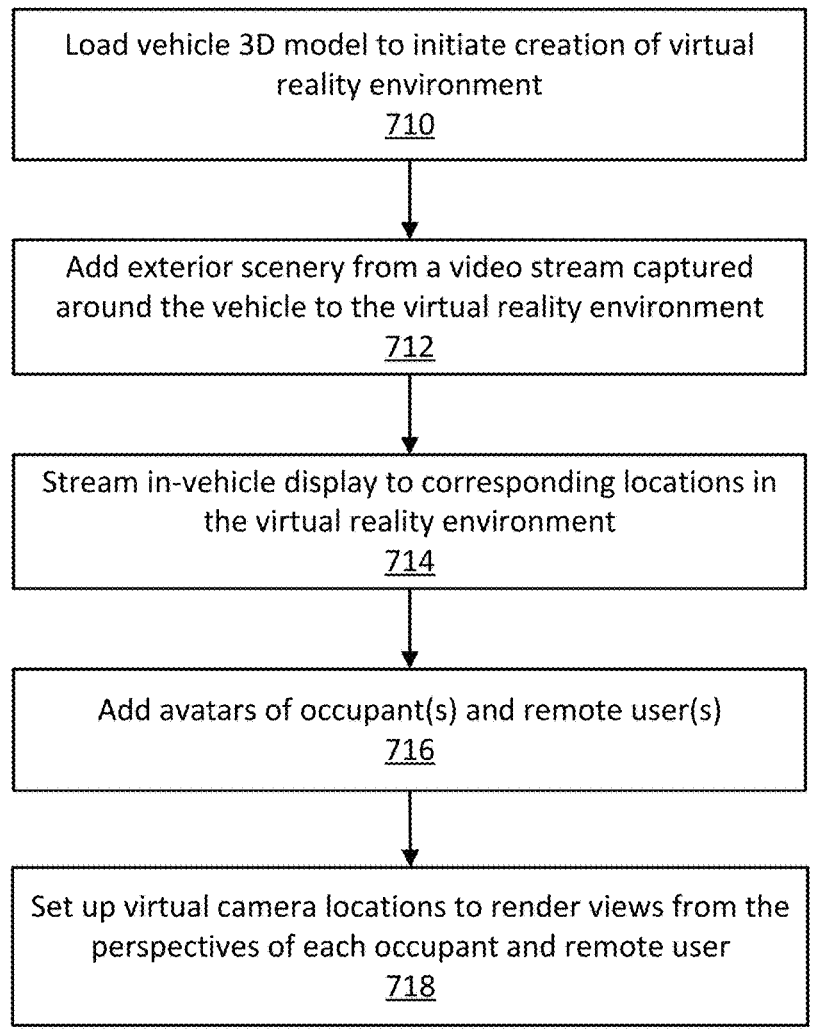
FIG. 7 is a flowchart of a method for constructing a virtual reality environment, according to an embodiment.

FIG. 7 is a flowchart of a method 700 for constructing a VR environment according to an embodiment. The method 700 can be performed at the server 220 which, as explained earlier, can be located in either vehicle system 210 or VR system 230, duplicated in both locations, or located physically separate from both the vehicle system 210 and the VR system 230.

At step 710, a 3D model of a vehicle is loaded, e.g., by the virtual reality module 222, to initiate the construction of the VR environment. The 3D model may serve as a base upon which image content is added to form the VR environment and can include the interior of the vehicle as well as, in some embodiments, the exterior of the vehicle. The 3D model can be loaded, for example, from the data store 224 of the server 220 or the data store 219 of the vehicle system 210.

At step 712, exterior scenery from one or more video streams captured around the vehicle is added to the VR environment. The video streams may be mapped to the vehicle windows in the 3D model and stitched together to provide a 360 degree view of the vehicle surroundings. For example, a video stream captured by a front-facing camera can be mapped to the front windshield to simulate a view of the exterior environment as seen through the front windshield, while additional video streams captured from left-mirror and right-mirror cameras are mapped to side windows. The exterior video streams can also be stitched together either in the vehicle system or the server to generate a 360 degree video, which can then be mapped around the vehicle 3D model to form one single video stream. Thus, the VR environment may be updated to create the illusion of being surrounded by the same scenery as the actual vehicle.

At step 714, an in-vehicle display is streamed to corresponding locations in the VR environment. For example, media content shown on an instrument cluster can be mirrored to a virtual instrument cluster. Similarly, media content shown on a center console can be mirrored to a virtual center console. Non-media content, such as text or other information output on the in-vehicle display, can also be streamed.

At step 716, avatars of each occupant in the vehicle and each remote user are added to the VR environment. Occupant avatars may be placed into the VR environment in positions corresponding to the actual location of each occupant, based on received information about the location of each occupant. For example, an avatar of the driver may be placed in the driver's seat of the VR environment. Similarly, a remote user avatar may be placed in the seat of a virtual passenger. For example, an avatar of a first remote user may be placed in an unoccupied back seat while an avatar of a second remote user may be placed in an unoccupied front seat.

Steps 712 to 716 can be performed in any order.

At step 718, virtual camera locations are setup in order to render the view from the perspective of the remote user(s) and the view from the perspective of the occupant(s), e.g., from the perspective of the driver as if he or she was looking at the rearview mirror. For example, referring back to FIGS. 6A and 6B, a virtual camera can be positioned as shown in FIG. 6A in order to render a scene from a specific remote user seating position, while a separate virtual camera is positioned as shown in FIG. 6B to render the virtual view of looking into a rearview mirror.

Figure 8:
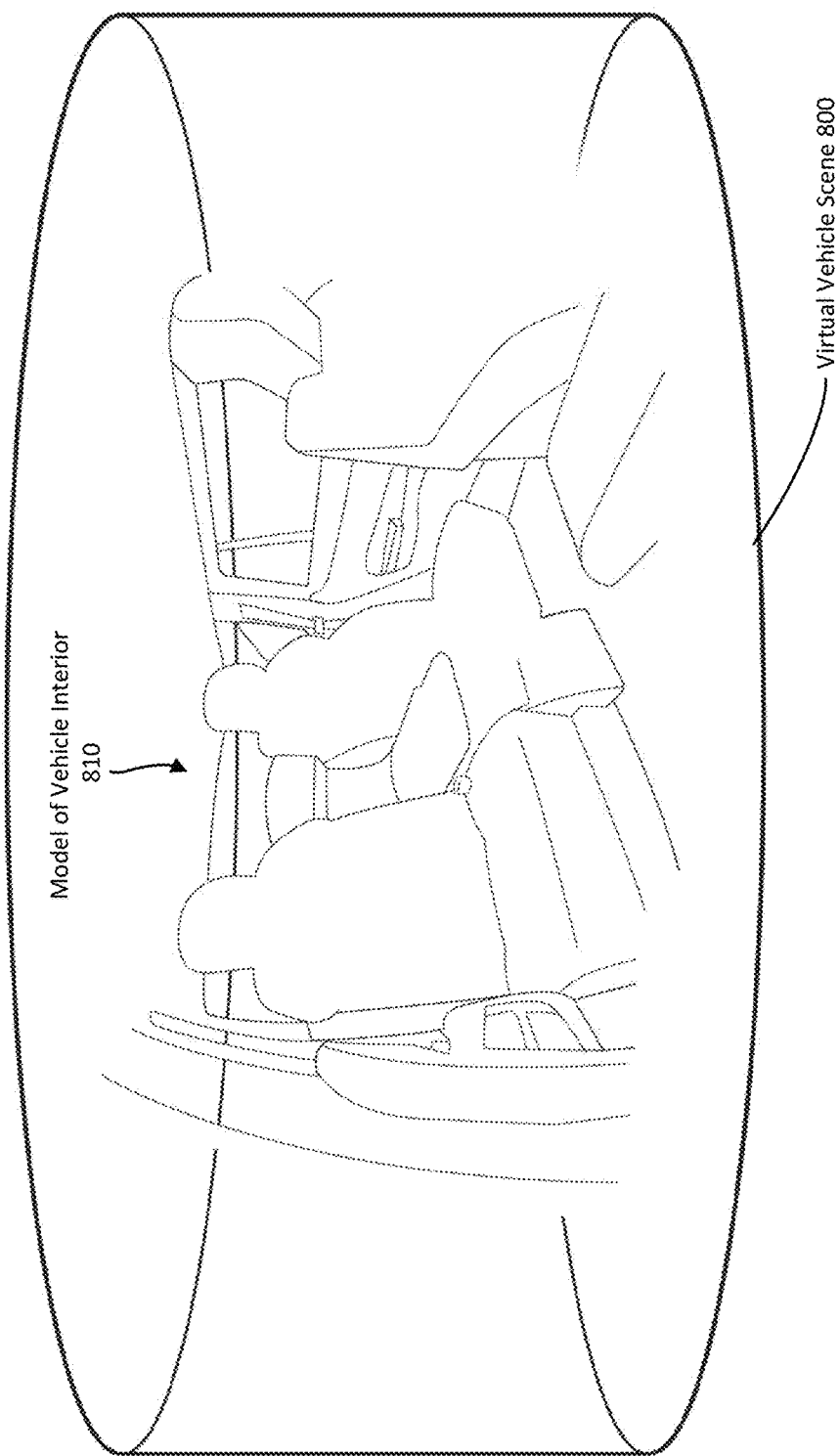
FIG. 8 shows a virtual vehicle scene generated based on a 3D model of a vehicle interior.

FIG. 8 shows an exemplary virtual vehicle scene 800 generated based on a 3D model 810 of a vehicle interior. The virtual vehicle scene 800 can be generated by capturing videos of the exterior environment around the vehicle, stitching the videos to form a 360 degree view of the vehicle surroundings, and mapping the videos to corresponding locations in the vehicle model to render the scene from the perspective of a virtual passenger, as discussed earlier.

Figure 9:
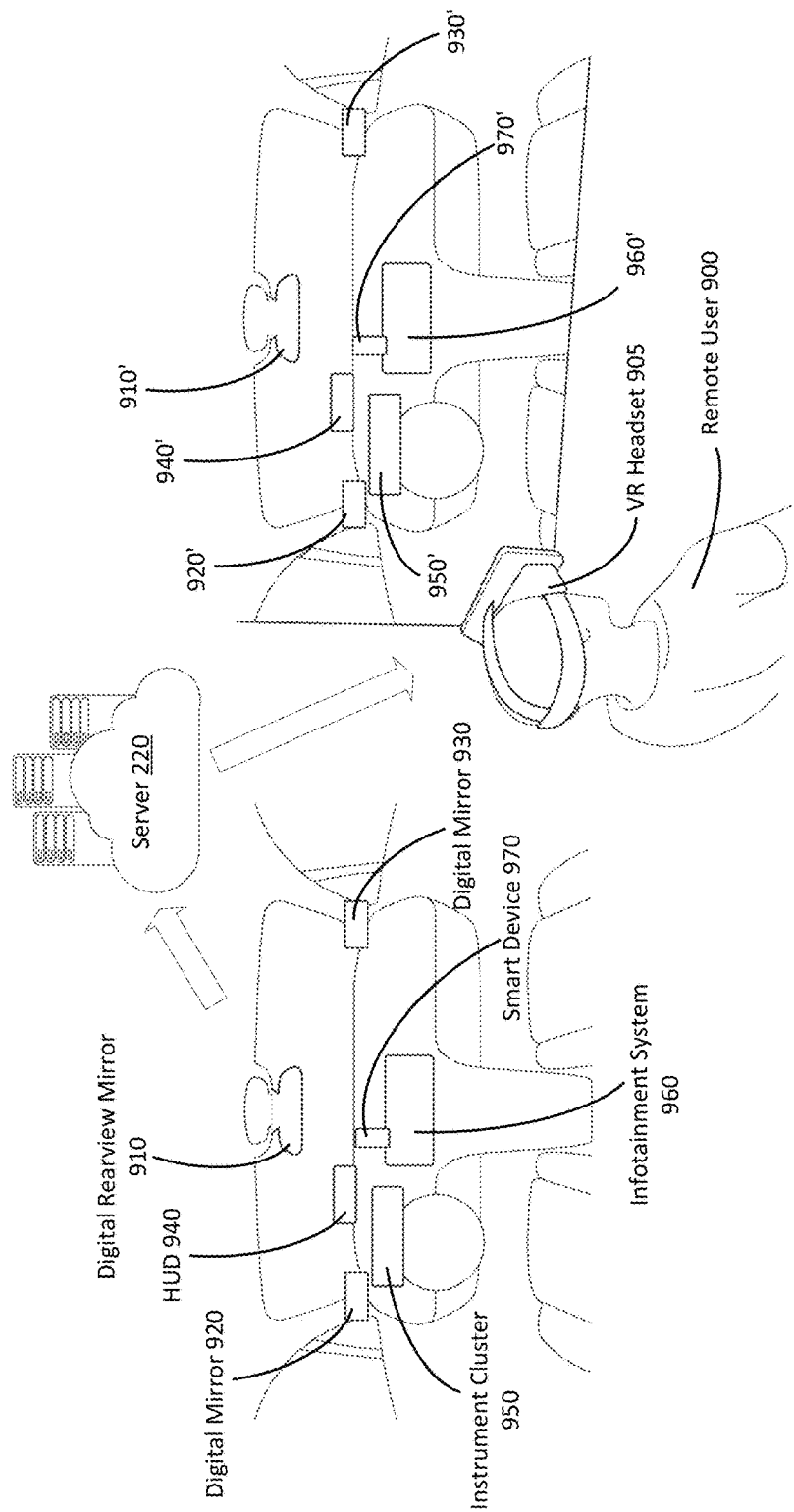
FIG. 9 shows rendering of media content from various in-vehicle display devices onto a virtual reality environment for display to a remote user.

FIG. 9 shows the rendering of media content from various in-vehicle display devices onto a virtual reality environment for display to a remote user 900 wearing a VR headset 905. The in-vehicle display devices can include a digital rearview mirror 910, a left digital mirror 920, a right digital mirror 930, a head-up display (HUD) 940, an instrument cluster 950, an infotainment system 960, and a smart device 970. Media presented on each of these display devices can be transmitted to the server 220 for mirroring onto the VR headset 905 or some other display device of the remote user 900. As shown in FIG. 9, each display device may have a counterpart in virtual space, namely a digital rearview mirror 910', a left digital mirror 920', a right digital mirror 930', a HUD 940', an instrument cluster 950', an infotainment system 960', and a smart device 970'. The virtual counterpart devices can be defined in a 3D model of the vehicle interior.

Media mirroring permits high quality sharing of media between occupants and remote users. In contrast to using an image sensor to capture an image of visual media shown on a display device or an audio sensor to capture audio media playing on an audio device, media mirroring can enable streaming of media content to or from the remote user 900 in a native format. For example, an image file stored on the data store 219 of FIG. 2 can be transmitted to the server 220 for display to the remote user 900 without loss of image quality. In this way, a copy of information that is displayed on one or more in-vehicle displays can be sent to the remote user. To reduce data transfer bandwidth, a copy of an in-vehicle display module could be executed on the server 220 or on the VR system 230, so that only the state of the in-vehicle display needs to be transferred, and the server 220 or VR system 230 can regenerate the in-vehicle display in the virtual environment based on the state information. For example, sending only the on/off state of light indicators, current speed, mileage, and fuel percentage, could be sufficient to regenerate an instrument cluster.

Figure 10:
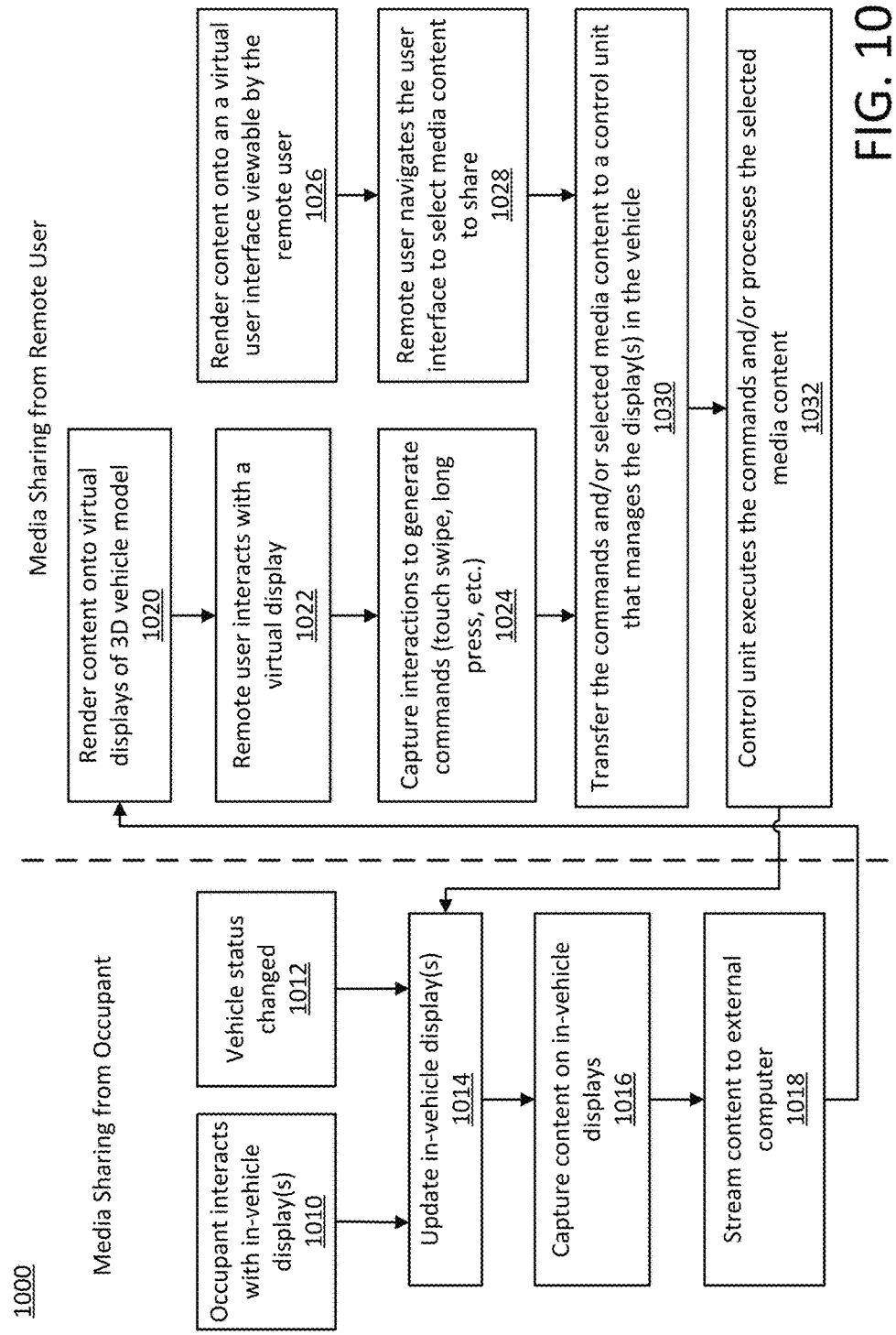
FIG. 10 is a flowchart of a method for sharing media between an occupant and a remote user, according to an embodiment.

FIG. 10 is a flowchart of a method 1000 for sharing media between an occupant and a remote user. The method 1000 includes steps performed on the vehicle side and steps performed on the remote user side. The blocks to the left of the dotted line include steps for sharing media content selected by an occupant. The blocks to the right of the dotted line include steps for sharing media content selected by the remote user.

Steps 1010 and 1012 correspond to events that trigger a change in one or more in-vehicle displays. At step 1010, an occupant interacts with the in-vehicle display(s). Examples of interactions include changing a radio station, adjusting a temperature setting, selecting a song to be played, activating a navigation system, and selecting playback of media content (e.g., a movie to be shown on a passenger display). Whereas step 1010 involves an explicit instruction or command from the occupant, step 1012 does not. At step 1012, a status of the vehicle is changed. Vehicle status can include any number of parameters describing the current state of the vehicle. Examples of parameters that determine vehicle status include speed, remaining fuel capacity, an odometer or tachometer output, and automated warnings (e.g., low tire pressure or check engine lights).

At step 1014, one or more in-vehicle displays are updated in response to step 1010 and/or step 1012. For example, if the occupant changed radio stations, the center console may be updated to display the name of the selected radio station. Similarly, the instrument cluster may be updated to reflect the current speed, number of engine revolutions, or distance traveled during the current trip.

At step 1016, content presented on one or more in-vehicle displays is captured, e.g., by the vehicle system 210. The captured content may include audio content, video content, or multimedia content stored in the data store 219. The captured content may also include other information besides media content, e.g., information indicating the status of the vehicle.

At step 1018, the captured content is streamed to an external computer, e.g., to the VR system 230 or the server 220.

At step 1020, the captured content is rendered onto one or more virtual displays, which are counterparts to the in-vehicle displays in a 3D model of the vehicle interior. The virtual display(s) may be viewed through a display device of the remote user, such as a VR headset, a smartphone, or an external monitor.

At step 1022, the remote user interacts with a virtual display, for example using a controller, a touchscreen, gesture recognition system or some other user input device. In some embodiments, the remote user may interact through virtual representations of in-vehicle controls (e.g., a touchscreen on an infotainment system) that are defined in the 3D model of the vehicle interior or through custom interactions developed specifically for the VR system 230.

At step 1024, the interactions of the remote user are captured (e.g., by the VR system 230) to generate commands such as a touch swipe, a long press, etc. The commands may affect the playback of currently selected media content (e.g., skipping to the next song in a playlist, changing radio channels, or pausing playback of a slideshow).

At step 1026, media content is rendered on a user interface viewable by the remote user, but not the occupant. For example, in addition to the virtual counterparts to the in-vehicle displays, the VR system 230 may provide a virtual desktop by which media content such as music, photos, websites, etc. can be browsed and selected for sharing with the occupant.

At step 1028, the remote user navigates the user interface to select media content to share with the occupant. The user interface may permit the remote user to preview the selected media item before confirming that the selected media item should be shared.

At step 1030, the commands generated in step 1024 and/or the media content selected in step 1028 are transferred to a control unit that manages one or more in-vehicle displays. For example, the commands/selected content can be transmitted via the server 220 to a processor that controls the infotainment system in the vehicle.

At step 1032, the control unit executes the commands and/or processes the selected media content. To ensure safety, it may be desirable to prevent execution of commands that affect vehicle operations that are critical to driving. The processing may cause the selected media content to be presented on different in-vehicle displays depending on the type of content. For example, if the content corresponds to navigation directions or a map, the content can be presented by updating a navigation system in the vehicle. If the content is a video, the video may be shown on a passenger display or some other selected display. Thus, step 1032 feeds back into step 1014, where the in-vehicle display(s) may be updated based on the commands and/or the selected media content. In turn, step 1014 may lead to rendering of content captured on the in-vehicle display(s) on a virtual counterpart in step 1020.

In addition to communicating information about body motion, speech, and media sharing, a system according to an embodiment of the present disclosure may provide for annotation of objects located in the exterior environment of the vehicle. The annotations can be applied to a display of the occupant and/or the remote user, as shown in FIG. 11.

Figure 11:
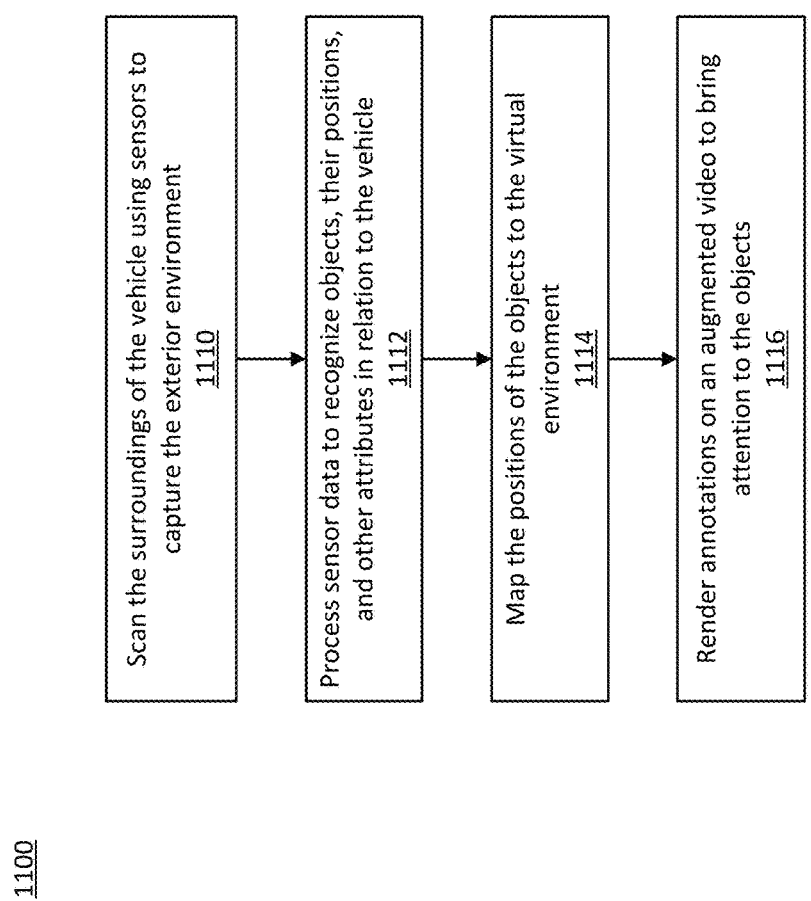
FIG. 11 is flowchart of a method for annotating objects located in the exterior environment of the vehicle, according to an embodiment.

FIG. 11 is flowchart of a method 1100 for annotating objects located in the exterior environment of the vehicle. At step 1110, vehicle sensors scan the surroundings to capture the exterior environment. The scanning can be performed by imaging and/or non-imaging sensors such as video cameras, radar, LIDAR, etc.

At step 1112, data captured by the vehicle sensors is processed to detect and recognize objects in the exterior environment. Object recognition can be performed in the vehicle (e.g., by the vehicle sensors or a central processor) or on an exterior computer (e.g., the server 220). Object recognition may involve determining various items of information about an object such as the position of the object relative to the vehicle, as well as other attributes such as size, speed, or object class (e.g., motor vehicle, pedestrian, building, bicyclist, etc.).

At step 1114, the positions of the objects are mapped to the virtual environment. The mapping may involve converting the positions from a coordinate in vehicle space to a corresponding coordinate in 3D virtual space, and can be performed, for example, by the server 220 in response to receiving the sensor data.

At step 1116, annotations are rendered on an augmented video to bring attention to the objects. The annotations can be rendered in response to input from the remote user or the occupant. For example, the remote user may select an object for annotation by gesturing towards the object (as depicted in an augmented video stream seen by the remote user) with a hand or finger, or using an input device such as a mouse or keyboard. Objects may also be selected by gazing in the direction of the object, e.g., for a certain period of time. Similarly, the occupant may select an object from an in-vehicle display, e.g., using a touchscreen or gazing through AR glasses. The occupant or remote user may also select a type of annotation to be applied. As mentioned earlier, annotations can include highlighting an object or an area around the object. Other types of annotations are possible, including adding a text label, displaying a graphical icon next to the object, changing a color or brightness of the object, rendering an outline around the object, etc. In some instances, annotations may automatically be applied in response to object recognition, without any manual input.

Annotations can also be generated using information from an external source such as a cloud service to, for example, add markers to points of interest.

Although annotations can be performed on an in-vehicle display, annotations are of particular benefit for the remote user because the remote user relies on augmented video for viewing the objects, whereas an occupant can see the object in real-life by looking through a window. Therefore annotations displayed on the remote user side (i.e., annotations applied to augmented video corresponding to the virtual environment) may enhance the shared experience by providing easy identification to the remote user of common reference points.

Figure 12:
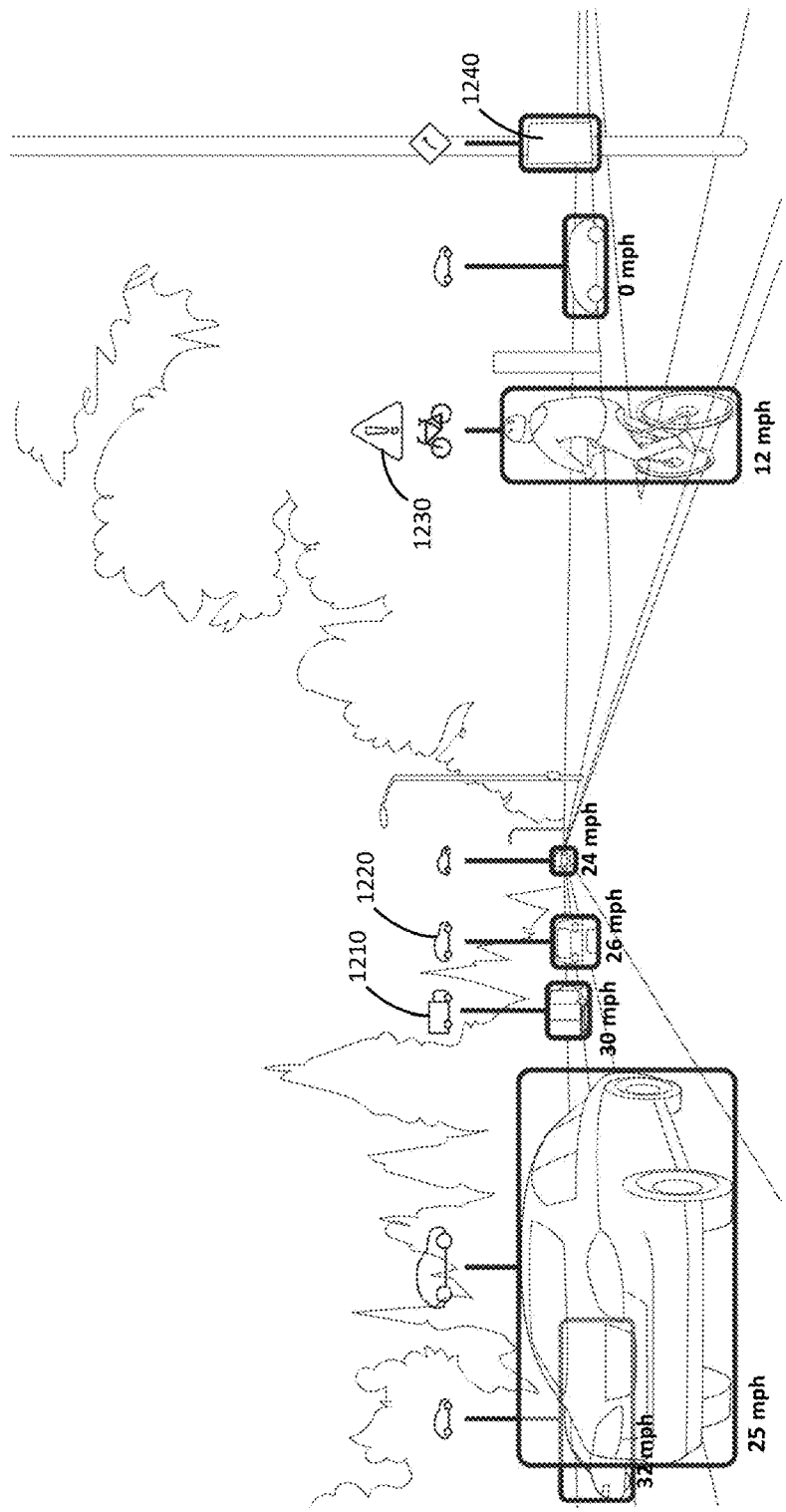
FIG. 12 shows an example annotated scene.

FIG. 12 shows an example of an annotated scene in which a variety of objects have been annotated by drawing a box around the object. The boxes can be shaded, for example using semi-transparent colors to produce a highlighting effect. FIG. 12 also shows additional annotations derived from sensor data, including an estimated speed of each moving/movable object in miles per hour (mph) and an icon representation a class of object (e.g., a truck icon 1210 and a car icon 1220). As shown, the sizes of the icons may vary depending on a distance of the object from the vehicle, for example with larger icons being used for objects that are closer. Annotations can be used to bring special attention to pedestrians, bicycles or other non-enclosed vehicles, or other objects that may be of concern to a driver of the vehicle. For example, an icon 1230 may be applied near a bicyclist as a warning to exercise caution when approaching the bicyclist. Fixed objects such as a road sign 1240 can also be annotated.

When combined with the sharing features described earlier, annotations provide an excellent way for an occupant and a remote user to communicate about the shared experience. For example, the occupant can speak about an exterior object and the remote user can see what object the occupant is speaking about. Likewise, the remote user can speak about an exterior object, and the occupant can see what object the remote user is speaking about. As another example, the occupant can point to an exterior object to cause an annotation to appear in relation to the object as depicted on the remote user side. Likewise, the remote user can point to or otherwise select an exterior object to cause an annotation to appear on an in-vehicle display.

Some portions of this description describe the embodiments of the disclosure in terms of algorithms and operations. These operations are understood to be implemented by computer programs or equivalent electrical circuits, machine code, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

In some embodiments, a software module is implemented with a computer program product comprising a non-transitory computer-readable storage medium containing computer program code, which can be executed by one or more computer processors for performing any or all of the steps, operations, or processes described. Examples of a non-transitory storage medium include, but are not limited to, a magnetic disk or tape, optical storage media such as compact disk (CD) or digital versatile disk (DVD), flash memory, or other memory devices.

The specification and drawings are, accordingly, to be regarded in an illustrative rather than a restrictive sense. It will, however, be evident that additions, subtractions, deletions, and other modifications and changes may be made thereunto without departing from the broader spirit and scope set forth in the claims. Thus, although specific embodiments have been described, these are not intended to be limiting. Various modifications and equivalents are within the scope of the following claims.

What is claimed is:

1. A method for providing a shared vehicle experience, comprising:
   capturing an exterior video stream that depicts an exterior environment of a vehicle;
   receiving remote user information indicating a bodily movement of a remote user;
   generating and displaying an augmented video stream comprising a dynamic avatar representing the remote user as a virtual passenger at a particular location in the vehicle, the dynamic avatar being updated based on the remote user information while the augmented video stream is being displayed in the vehicle; and
   sending at least a portion of the exterior video stream and occupant information to a computer device that causes, based on the at least a portion of the exterior video stream and the occupant information, a display device of the remote user to output an additional augmented video stream that provides the remote user with an experience of being in the vehicle, wherein the occupant information indicates a location of one or more occupants in the vehicle and a bodily movement of the one or more occupants while the augmented video stream is being displayed in the vehicle, wherein the additional augmented video stream, as output on the display device of the remote user, shows the exterior environment of the vehicle from a perspective of the virtual passenger at the particular location in the vehicle, and wherein the particular location in the vehicle is selectable from among a plurality of locations in the vehicle such that the dynamic avatar and the perspective of the virtual passenger can be moved to a different location of the plurality of locations in the vehicle.

2. The method of claim 1, further comprising:
   receiving information regarding a viewing window of the remote user, wherein the at least a portion of the exterior video stream sent to the remote user corresponds to the exterior environment as seen through the viewing window and from the perspective of the virtual passenger at the particular location in the vehicle.

3. The method of claim 1, wherein the augmented video stream comprises video of the dynamic avatar being rendered within a three-dimensional model of an interior of the vehicle.

4. The method of claim 3, wherein the augmented video stream further comprises a portion of the exterior video stream corresponding to the exterior environment as seen through at least one window of the vehicle.

5. The method of claim 1, further comprising:
   producing audio within an interior of the vehicle based on sound captured from the remote user and the remote user information, wherein the audio is produced from a direction of the virtual passenger in the vehicle, and wherein the audio varies dynamically according to a head movement of the remote user.

6. The method of claim 1, further comprising:
receiving input from the remote user; and
updating an in-vehicle display to present media based on the input from the remote user.

7. The method of claim 1, further comprising:
capturing the bodily movement of the one or more occupants of the vehicle using a time of flight camera.

8. The method of claim 1, wherein the augmented video stream is displayed in a horizontally flipped manner to create a mirroring effect.

9. The method of claim 1, further comprising:
capturing and sending information that is displayed on one or more in-vehicle displays to the remote user.

10. The method of claim 1, further comprising:
selecting, as the particular location in the vehicle, a seat position for the virtual passenger based at least on a number and position of the occupants in the vehicle; and
rendering the dynamic avatar of the virtual passenger at the selected seat position in the augmented video stream.

11. The method of claim 1, further comprising:
generating one or more audio streams, each audio stream corresponding to sound captured from an occupant of the vehicle; and
sending the one or more audio streams to the remote user for spatial audio output.

12. A system for providing a shared vehicle experience, comprising:
at least one sensor configured to capture an exterior video stream that depicts an exterior environment of a vehicle; and
one or more processors configured to:
receive remote user information indicating a bodily movement of a remote user,
generate an augmented video stream comprising a dynamic avatar representing the remote user as a virtual passenger at a particular location in the vehicle,
cause the augmented video stream to be output on an in-vehicle display,
update the dynamic avatar based on the remote user information while the augmented video stream is being displayed in the vehicle, and
send at least a portion of the exterior video stream and occupant information to a computer device that causes, based on the at least a portion of the exterior video stream and the occupant information, a display device of the remote user to output an additional augmented video stream that provides the remote user with an experience of being in the vehicle, wherein the occupant information indicates a location of one or more occupants in the vehicle and a bodily movement of the one or more occupants while the augmented video stream is being displayed in the vehicle, wherein the additional augmented video stream, as output on the display device of the remote user, shows the exterior environment of the vehicle from a perspective of the virtual passenger at the particular location in the vehicle, and wherein the particular location in the vehicle is selectable from among a plurality of locations in the vehicle such that the dynamic avatar and the perspective of the virtual passenger can be moved to a different location of the plurality of locations in the vehicle.

13. The system of claim 12, wherein the one or more processors are further configured to receive information regarding a viewing window of the remote user, and wherein the at least a portion of the exterior video stream sent to the remote user corresponds to the exterior environment as seen through the viewing window and from the perspective of the virtual passenger at the particular location in the vehicle.

14. The system of claim 12, wherein the augmented video stream comprises video of the dynamic avatar being rendered within a three-dimensional model of an interior of the vehicle.

15. The system of claim 14, wherein the augmented video stream further comprises a portion of the exterior video stream corresponding to the exterior environment as seen through at least one window of the vehicle.

16. The system of claim 12, wherein the one or more processors are further configured to produce audio within an interior of the vehicle based on sound captured from the remote user and the remote user information, wherein the audio is produced from a direction of the virtual passenger in the vehicle, and wherein the audio varies dynamically according to a head movement of the remote user.

17. The system of claim 12, wherein the one or more processors are further configured to:
receive input from the remote user; and
update an in-vehicle display to present media based on the input from the remote user.

18. The system of claim 12, wherein the one or more processors are further configured to capture and send information that is displayed on one or more in-vehicle displays to the remote user.

19. The system of claim 12, wherein the one or more processors are further configured to:
select, as the particular location in the vehicle, a seat position for the virtual passenger based at least on a number and position of the occupants in the vehicle; and
render the dynamic avatar of the virtual passenger at the selected seat position in the augmented video stream.

20. A computer-readable storage medium containing instructions that, when executed by one or more processors of a computer, cause the one or more processors to:
capture an exterior video stream that depicts an exterior environment of a vehicle;
receive remote user information indicating a bodily movement of a remote user;
generate and display an augmented video stream comprising a dynamic avatar representing the remote user as a virtual passenger at a particular location in the vehicle, the dynamic avatar being updated based on the remote user information while the augmented video stream is being displayed in the vehicle; and
send at least a portion of the exterior video stream and occupant information to a computer device that causes, based on the at least a portion of the exterior video stream and the occupant information, a display device of the remote user to output an additional augmented video stream that provides the remote user with an experience of being in the vehicle, wherein the occupant information indicates a location of one or more occupants in the vehicle and a bodily movement of the one or more occupants while the augmented video stream is being displayed in the vehicle, wherein the additional augmented video stream, as output on the display device of the remote user, shows the exterior environment of the vehicle from a perspective of the virtual passenger at the particular location in the vehicle, and wherein the particular location in the vehicle is selectable from among a plurality of locations in the vehicle such that the dynamic avatar and the perspective of the virtual passenger can be moved to a different location of the plurality of locations in the vehicle.

* * * * *